US012181172B2

(12) United States Patent
Gorad et al.

(10) Patent No.: US 12,181,172 B2
(45) Date of Patent: Dec. 31, 2024

(54) SUPPORT ASSEMBLY FOR HVAC SYSTEM

(71) Applicant: Johnson Controls Tyco IP Holdings LLP, Milwaukee, WI (US)

(72) Inventors: Sushilkumar D. Gorad, Pune (IN); Timothy J. Wilson, St. Petersburg, FL (US); Abhijeet R. Salunkke, Pune (IN); Rohan K. More, Gulbarga (IN); Angus B. Latham, St. Petersburg, FL (US); Tarun Dogra, Beri (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 469 days.

(21) Appl. No.: 17/395,283

(22) Filed: Aug. 5, 2021

(65) Prior Publication Data
US 2023/0038273 A1 Feb. 9, 2023

(51) Int. Cl.
*F24F 13/00* (2006.01)
*F16L 3/12* (2006.01)
*F16L 3/123* (2006.01)
*F16L 3/22* (2006.01)
*F24F 13/02* (2006.01)

(52) U.S. Cl.
CPC ........ *F24F 13/0254* (2013.01); *F16L 3/1222* (2013.01); *F16L 3/123* (2013.01); *F16L 3/221* (2013.01)

(58) Field of Classification Search
CPC ..... F24F 13/0254; F16L 3/123; F16L 3/1222; F16L 3/221
See application file for complete search history.

(56) References Cited

U.S. PATENT DOCUMENTS

| 2,653,783 A | * | 9/1953 | Lindsay | A47B 57/42 248/243 |
| 2,691,502 A | * | 10/1954 | Jones | A47B 96/1416 108/107 |
| 2,744,714 A | * | 5/1956 | Parke | A47B 57/565 52/36.5 |
| 3,355,132 A | * | 11/1967 | Jenkins | H02G 3/0456 248/327 |

(Continued)

FOREIGN PATENT DOCUMENTS

DE 202016104509 U1 * 10/2016
EP 568887 A1 * 11/1993 ............. F16L 3/221

(Continued)

OTHER PUBLICATIONS

Caleffi Hydronic Solutions, "The little great Caleffi Fan-Coil Kit," YouTube, Dec. 3, 2018, 3:27 minutes, https://www.youtube.com/watch?v=naf27DnfmPU.

(Continued)

*Primary Examiner* — Eret C McNichols
(74) *Attorney, Agent, or Firm* — Fletcher Yoder, PC

(57) ABSTRACT

A support assembly for a heating, ventilation, and/or air conditioning (HVAC) system includes a bracket comprising a base and an arm extending from the base. The arm includes a flange having a plurality of connectors configured to facilitate coupling to a clamp at each of a plurality of positions along the arm. The arm is configured to engage with and support a conduit of the HVAC system via the clamp.

19 Claims, 9 Drawing Sheets

(56) References Cited

U.S. PATENT DOCUMENTS

| | | | | |
|---|---|---|---|---|
| 3,966,056 | A * | 6/1976 | Larson | A47F 5/0018 108/92 |
| 4,013,253 | A * | 3/1977 | Perrault | H02G 3/263 248/248 |
| 4,907,766 | A * | 3/1990 | Rinderer | F16L 3/243 248/57 |
| 4,957,251 | A * | 9/1990 | Hubbard | F16L 3/22 248/300 |
| 5,149,026 | A * | 9/1992 | Allen | F16L 5/10 248/74.1 |
| D368,648 | S * | 4/1996 | Losier | D8/356 |
| 5,632,457 | A * | 5/1997 | Neely, Jr. | F16L 3/233 248/69 |
| 5,855,073 | A * | 1/1999 | Boelling | A47B 96/061 52/127.2 |
| 5,876,000 | A * | 3/1999 | Ismert | F16L 3/221 248/65 |
| 5,971,329 | A * | 10/1999 | Hickey | F16L 3/227 248/65 |
| 6,082,690 | A * | 7/2000 | Durin | H02G 3/263 211/90.01 |
| 6,138,583 | A * | 10/2000 | Mahone | A47B 57/42 211/187 |
| 6,202,966 | B1 * | 3/2001 | MacDonald | A47B 57/425 248/247 |
| 6,951,324 | B2 * | 10/2005 | Karamanos | F24H 9/06 248/65 |
| 7,014,383 | B2 * | 3/2006 | Schmid | E04B 1/2604 403/231 |
| 7,039,965 | B1 * | 5/2006 | Ismert | E03C 1/021 248/68.1 |
| 7,131,792 | B2 * | 11/2006 | Doverspike | F16L 3/227 248/68.1 |
| 7,537,183 | B2 * | 5/2009 | Karamanos | F24H 9/06 248/65 |
| 7,600,724 | B2 * | 10/2009 | Nelson | F16L 3/221 248/68.1 |
| 8,042,777 | B2 * | 10/2011 | Ruiz | H02G 3/086 248/300 |
| 8,177,079 | B2 * | 5/2012 | Schwartzkopf | A47B 96/067 211/94.01 |
| 8,678,206 | B2 * | 3/2014 | Kubiniec | F41A 23/18 211/64 |
| 8,714,236 | B2 * | 5/2014 | Karamanos | F16L 3/08 165/145 |
| 8,998,154 | B2 * | 4/2015 | Lupsa | H02G 3/12 248/200.1 |
| 9,016,662 | B2 | 4/2015 | Staffiere et al. | |
| 9,243,848 | B2 * | 1/2016 | Evans | F24H 1/28 |
| 9,523,374 | B2 * | 12/2016 | Yazykov | F17C 13/08 |
| 9,534,709 | B2 * | 1/2017 | Wilson | F16L 3/227 |
| 9,625,164 | B2 * | 4/2017 | Vargas | F24F 13/02 |
| 9,694,452 | B2 * | 7/2017 | Karamanos | F28F 9/002 |
| RE46,708 | E * | 2/2018 | Karamanos | F24F 13/30 |
| 10,371,291 | B2 * | 8/2019 | Morris | F16L 59/135 |
| 10,750,634 | B2 * | 8/2020 | Lee | H05K 7/20209 |
| 10,852,008 | B2 * | 12/2020 | Daniels | F24D 17/0078 |
| D986,037 | S * | 5/2023 | Davis | D8/373 |
| 2002/0104942 | A1 * | 8/2002 | Mimlitch, III | H05K 7/186 248/300 |
| 2004/0060250 | A1 * | 4/2004 | Sukup | F16B 5/02 52/713 |
| 2006/0011796 | A1 * | 1/2006 | Karamanos | F24H 9/06 248/300 |
| 2007/0296315 | A1 * | 12/2007 | Francisquini | F24F 1/022 62/263 |
| 2008/0174970 | A1 * | 7/2008 | Rees | G01R 15/207 361/726 |
| 2010/0317278 | A1 * | 12/2010 | Novick | H05K 7/20836 62/401 |
| 2012/0192813 | A1 * | 8/2012 | Evans | F24H 15/414 122/20 B |
| 2012/0279929 | A1 * | 11/2012 | Daniels | F24D 17/0031 122/13.01 |
| 2014/0054425 | A1 * | 2/2014 | Jang | F16L 3/00 248/49 |
| 2014/0103130 | A1 * | 4/2014 | Brown | F16M 13/02 237/66 |
| 2015/0107277 | A1 * | 4/2015 | Moore | F24F 1/027 62/298 |
| 2017/0086334 | A1 * | 3/2017 | Riddle | H05K 7/20836 |
| 2020/0355394 | A1 | 11/2020 | Karamanos | |
| 2022/0087446 | A1 * | 3/2022 | Friend | A47F 3/0408 |

FOREIGN PATENT DOCUMENTS

| | | | | |
|---|---|---|---|---|
| EP | 1245171 | A1 | 10/2002 | |
| EP | 1150075 | B1 | 12/2004 | |
| EP | 1770840 | A1 * | 4/2007 | H02G 3/263 |
| EP | 2369248 | A2 * | 9/2011 | F24F 1/62 |
| EP | 2062503 | B1 | 5/2017 | |
| WO | WO-03016790 | A1 * | 2/2003 | A47B 96/061 |
| WO | 2019242910 | A1 | 12/2019 | |

OTHER PUBLICATIONS

AC Parts, "Wall Mounting Bracket for Mini Split Air Conditioner Condensing Unit, Heat Pump, 1-5P, Support up to 350lbs, Universal (12000-36000 btu)," Jan. 10, 2020, 3 Pages, https://www.amazon.in/AC-parts-Conditioner-Condensing-12000-36000/dp/B07MTDF2SD.

Johnson Controls, "Horizontal High Performance Fan Coil Units," Oct. 27, 2009, 3 Pages.

* cited by examiner

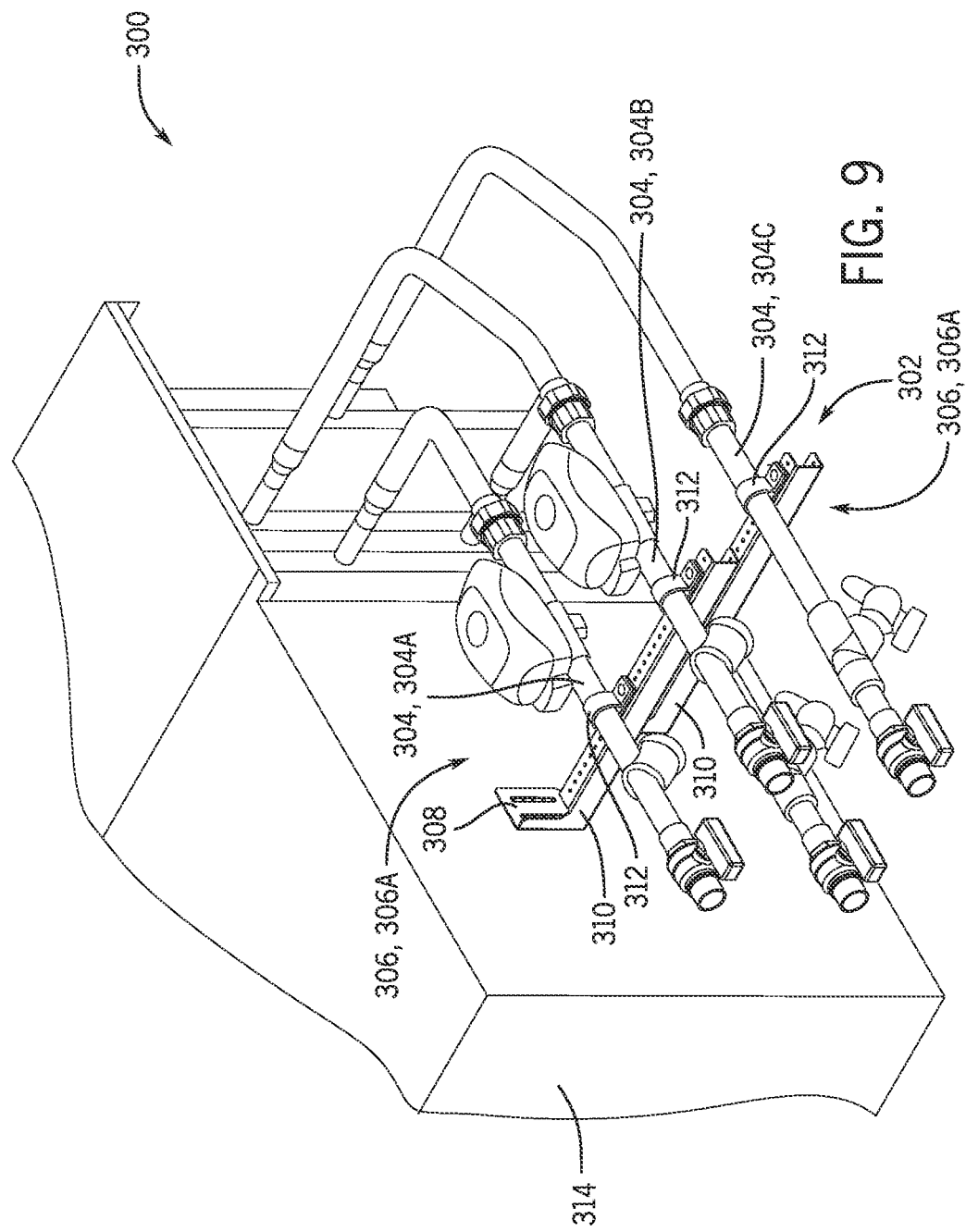

SUPPORT ASSEMBLY FOR HVAC SYSTEM

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a working fluid circulated through the HVAC system to condition the supply air flow. In certain embodiments, the HVAC system may include conduits (e.g., tubing, piping) that may circulate the working fluid through different components of the HVAC system. However, a portion of a conduit may move relative to other components of the HVAC system. As a result, a positioning, a structural integrity, and/or a geometry of the conduit (e.g., relative to the other components) may be susceptible to change, which may affect a manufacture and/or an operation of the HVAC system. For example, movement of the conduit may affect a flow of working fluid through the conduit and reduce efficiency of the HVAC system.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a support assembly for a heating, ventilation, and/or air conditioning (HVAC) system includes a bracket comprising a base and an arm extending from the base. The arm includes a flange having a plurality of connectors configured to facilitate coupling to a clamp at each of a plurality of positions along the arm. The arm is configured to engage with and support a conduit of the HVAC system via the clamp.

In one embodiment, a support assembly for a heating, ventilation, and/or air conditioning (HVAC) system includes a mounting bracket configured to be secured to a housing of the HVAC system, a support bracket configured to be secured to the mounting bracket, the support bracket being configured to be adjustably positioned relative to the mounting bracket along a first axis of the support assembly, and a clamp configured to be secured to the support bracket. The clamp is configured to be adjustably positioned relative to the support bracket along a second axis, crosswise to the first axis, of the support assembly, and the clamp is configured to secure a conduit of the HVAC system to the support assembly In one embodiment, a heating, ventilation, and/or air conditioning (HVAC) system includes a housing configured to direct an air flow therethrough, a conduit, and a support assembly mounted to the housing. The support assembly includes a mounting bracket mounted to the housing, a cantilevered arm secured to the mounting bracket and extending away from the housing, and a clamp secured to the cantilevered arm. The clamp extends about the conduit and secures the conduit to the support assembly, the cantilevered arm is configured to be secured to the mounting bracket at each first position of a plurality of first positions, and the clamp is configured to be secured to the cantilevered arm at each second position of a plurality of second positions

DRAWINGS

Various aspects of this disclosure may be better understood upon reading the following detailed description and upon reference to the drawings in which:

FIG. 9 is a perspective view of an embodiment of a portion of an HVAC system including a support assembly, in accordance with an aspect of the present disclosure.

DETAILED DESCRIPTION

Figure 1:
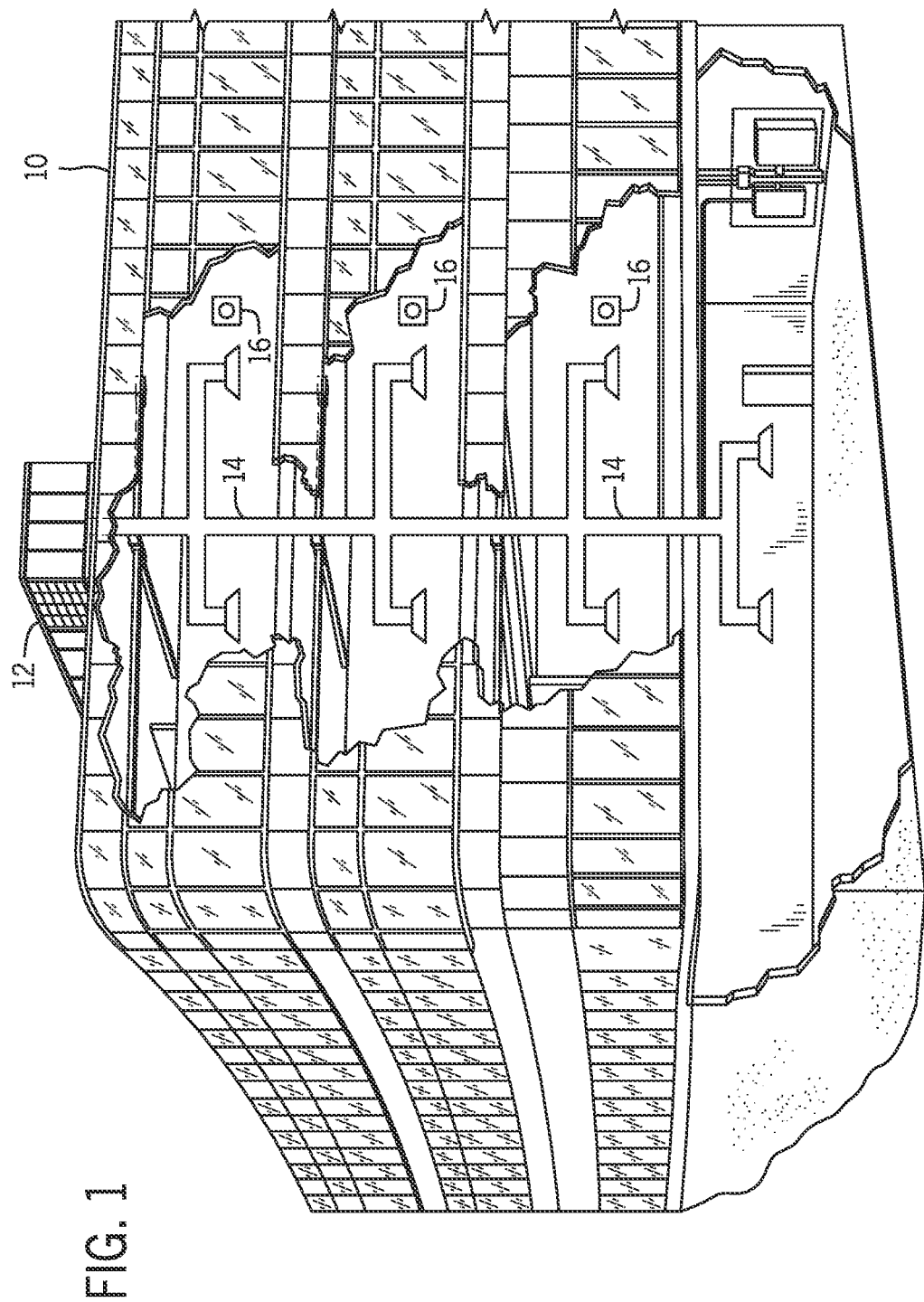
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system. The HVAC system may include a vapor compression system (e.g., a vapor compression circuit) configured to circulate a working fluid and place the working fluid in a heat exchange relationship with a conditioning fluid, such as an air flow, to change a temperature, humidity, or other characteristic of the conditioning fluid. For example, the HVAC system may include a heat exchanger configured to receive the working fluid and place the working fluid in a heat exchange relationship with the conditioning fluid to change a characteristic (e.g., temperature) of the conditioning fluid. The HVAC system may then deliver the conditioning fluid to condition a room, another fluid (e.g., process fluid), or the like. In some embodiments, the working fluid may heat the conditioning fluid. In additional or alternative embodiments, the working fluid may cool and/or dehumidify the conditioning fluid.

The HVAC system may include conduits, such as piping and/or tubing, configured to direct the working fluid through the HVAC system. For example, conduits may direct the working fluid into and/or out of the heat exchanger. In some existing HVAC systems, a portion or length of the conduits may be susceptible to movement relative to other components of the HVAC system, such as a housing and/or a heat exchanger of the HVAC system. As an example, during transportation of the HVAC system, a conduit may be moved and/or displaced (e.g., inadvertently adjusted or decoupled) relative to other components. As such, re-positioning, replacement, or re-installed of the conduit after transportation of the HVAC system may be involved, thereby encumbering installation of the HVAC system. As another example, during operation of the HVAC system, a weight of the conduit and/or the working fluid directed through the conduit may cause the conduit to bend or deflect relative to other HVAC system components, which may affect the flow of the working fluid through the conduit and/or the structural integrity of the conduit. For instance, a change in geometry or orientation of the conduit may reduce a flowrate of the working fluid through the conduit, thereby reducing efficiency of the HVAC system.

Thus, it is presently recognized that blocking undesirable movement of conduits of the HVAC system may improve an operation and/or manufacture of the HVAC system. Accordingly, embodiments of the present disclosure are directed to a support assembly configured to be coupled to the conduit and a housing of the HVAC system to block relative movement between the housing and the conduit. The support assembly may include a mounting bracket configured to couple to the housing and a support bracket having a base and an arm extending from the base. The base may be configured to couple the support bracket to the mounting bracket. The support assembly may also include a clamp (e.g., a pipe clamp) configured to couple to the arm of the support bracket. The clamp may be configured to capture a conduit of the HVAC system and to block movement of the conduit relative to the support bracket and/or mounting bracket and therefore relative to the housing of the HVAC system. As a result, the support assembly may facilitate maintaining a desirable structural integrity, geometry, and/or positioning of the conduit (e.g., relative to the housing), such as during operation and/or transportation of the HVAC system.

In some embodiments, the base may include slots configured to align with various arrangements of holes (e.g., mounting holes of the mounting bracket) to secure the support bracket to the housing of the HVAC system. For example, the support bracket may be configured to couple to the mounting bracket at each of a variety of positions along a first axis of the support assembly via alignment between the slots and a subset of the holes. The clamp may also be configured to couple to the arm at each of a variety of positions along a second axis, crosswise to the first axis of the support assembly. Movement of the support bracket along the first axis and the clamp along the second axis may position the clamp as desired, such as to align the clamp with a corresponding position of a conduit to be supported by the support assembly. As such, a single embodiment of the support assembly may be manufactured and used to support conduits incorporated in different embodiments of HVAC systems, such as HVAC systems having conduits positioned at different locations. In this manner, the disclosed design may also facilitate improved (e.g., more cost effective) manufacture and/or installation of the support assembly.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
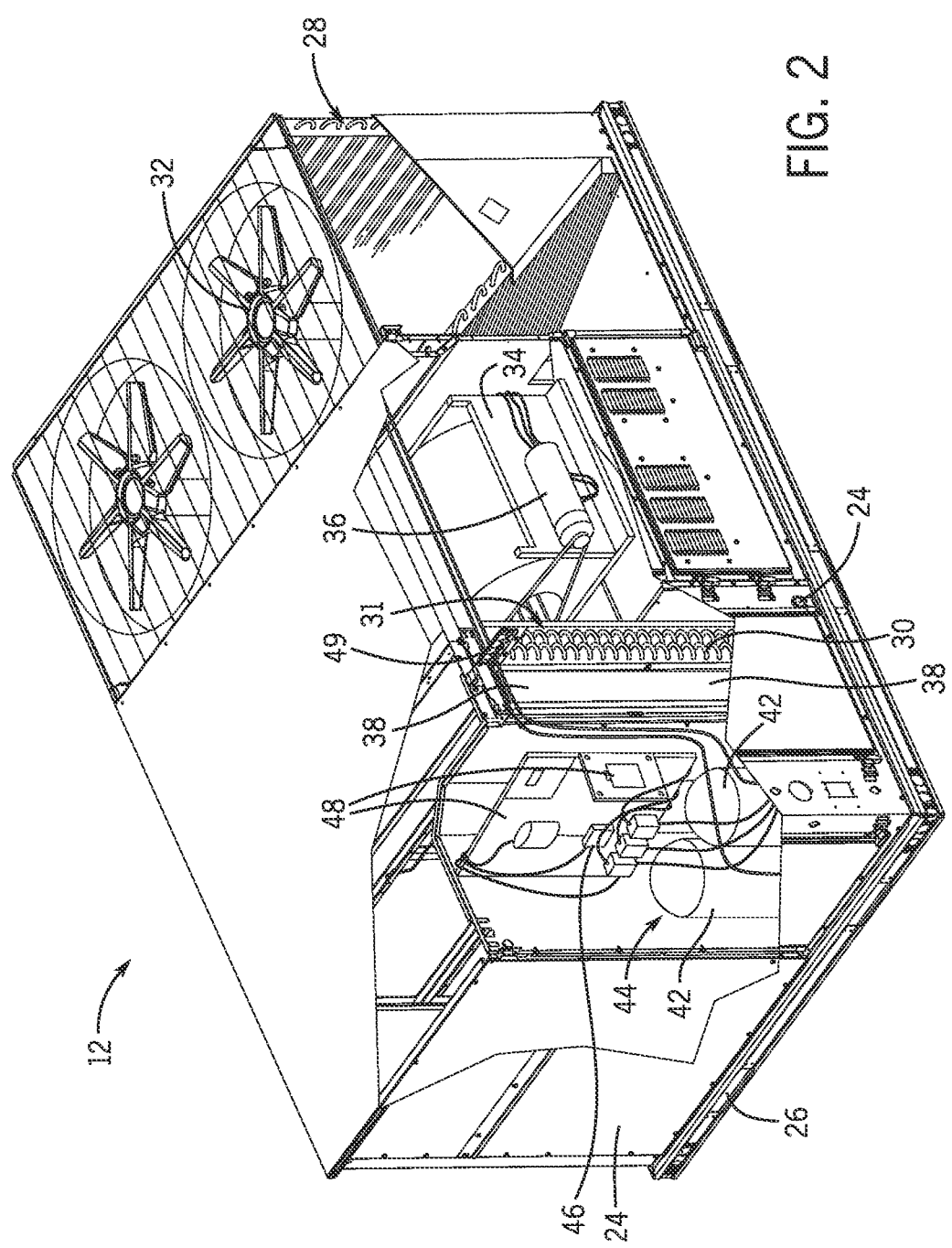
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
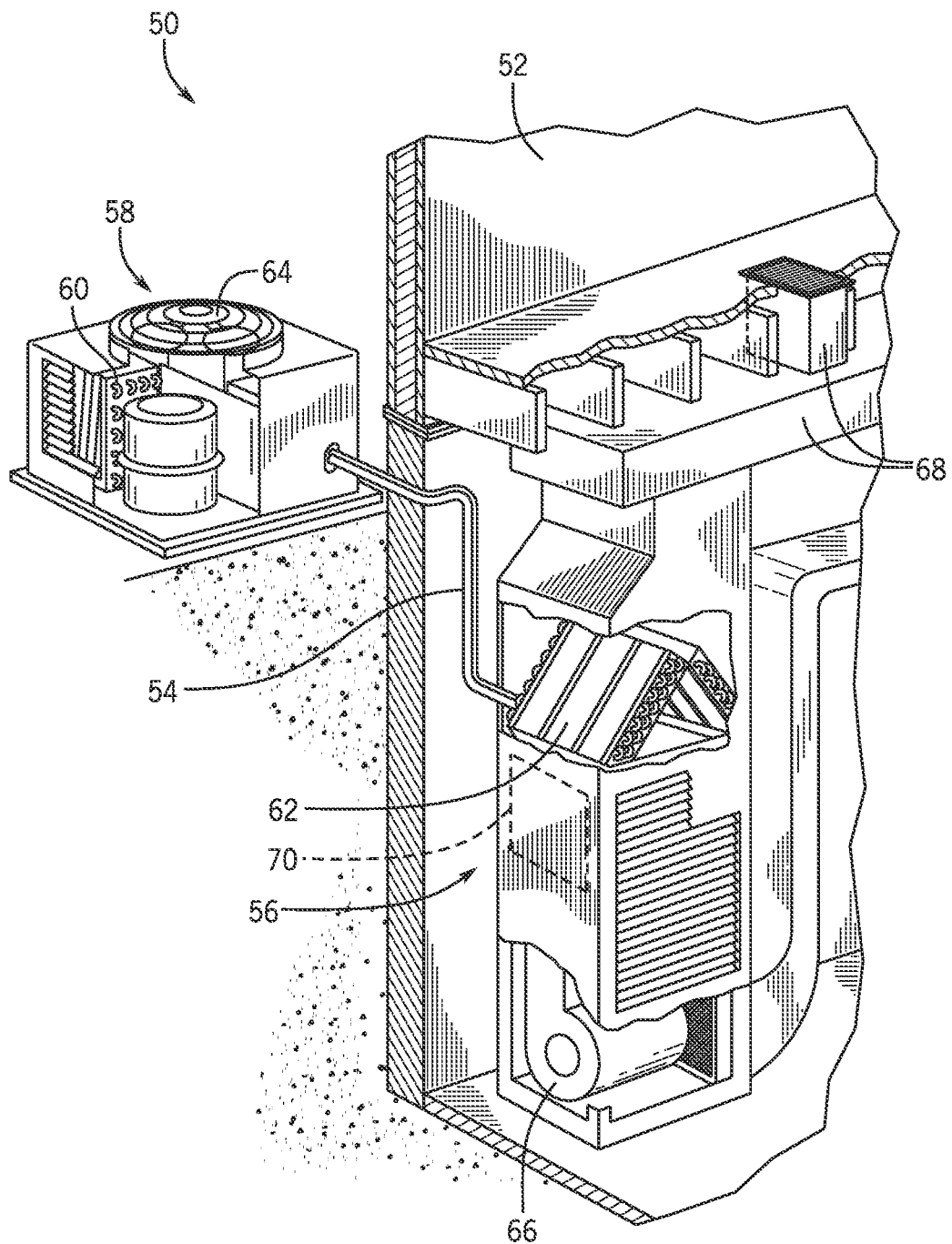
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
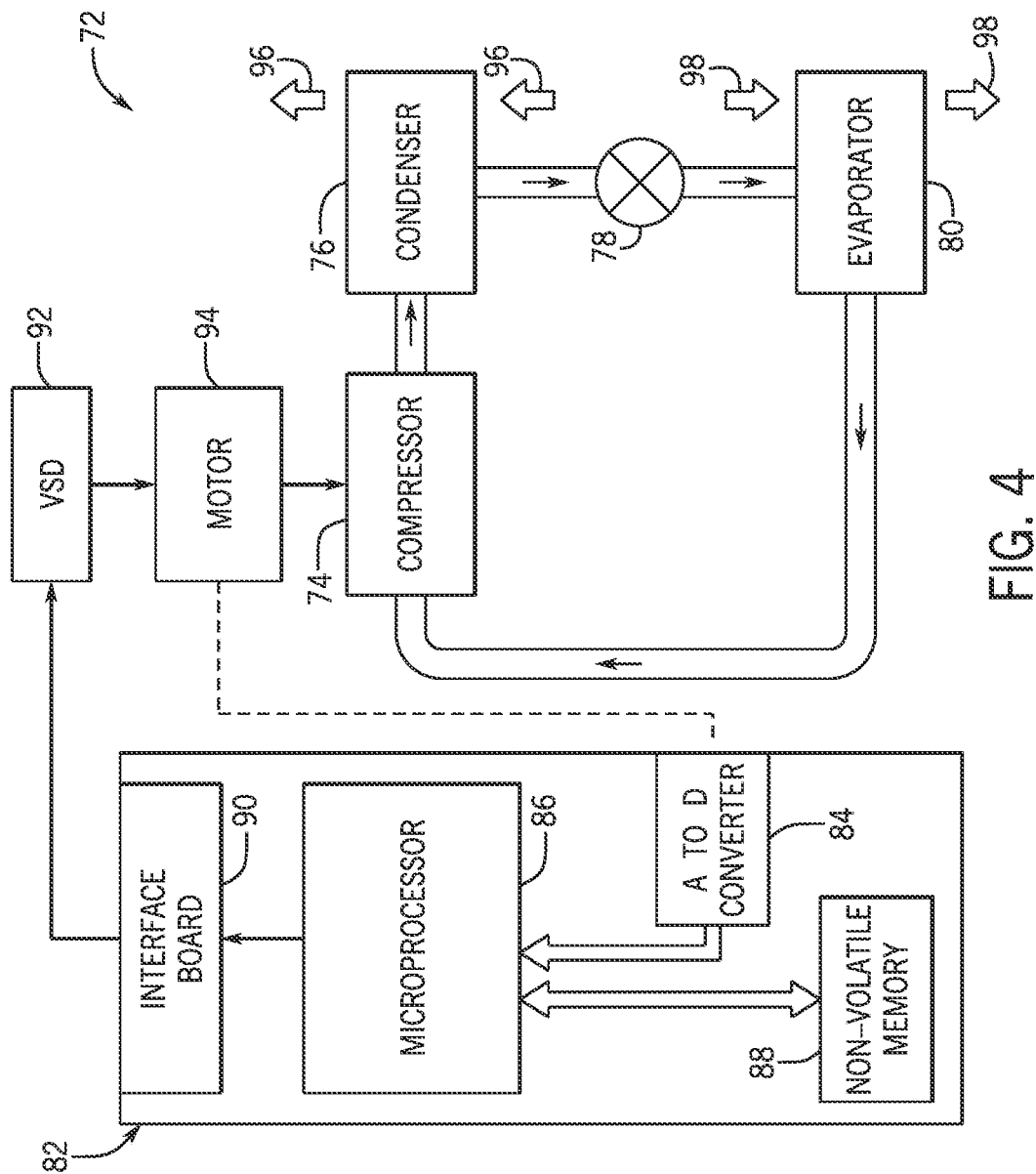
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to a support assembly of an HVAC system. The support assembly is configured to support a conduit of the HVAC system and block relative movement between the conduit and a housing of the HVAC system. The support assembly may include a bracket (e.g., a support bracket) and a clamp. The bracket may include a base configured to couple to the housing or to another support structure (e.g., a mounting bracket) coupled to the housing. The bracket also includes an arm extending from the base. The clamp may be configured to couple to the arm and to capture and secure the conduit to block movement of the conduit relative to the bracket and to the housing. The base may be adjustably positioned relative to the housing of the HVAC system along a first axis, and the clamp may be adjustably positioned relative to the arm along a second axis crosswise to the first axis. In this manner, the support assembly may be adjustable to position the clamp in a desirable location (e.g., relative to the housing), such as to align with a corresponding position of a conduit, thereby enabling a single embodiment of the support assembly to be used for supporting conduits at different positions and/or conduits incorporated with different housings.

Figure 5:
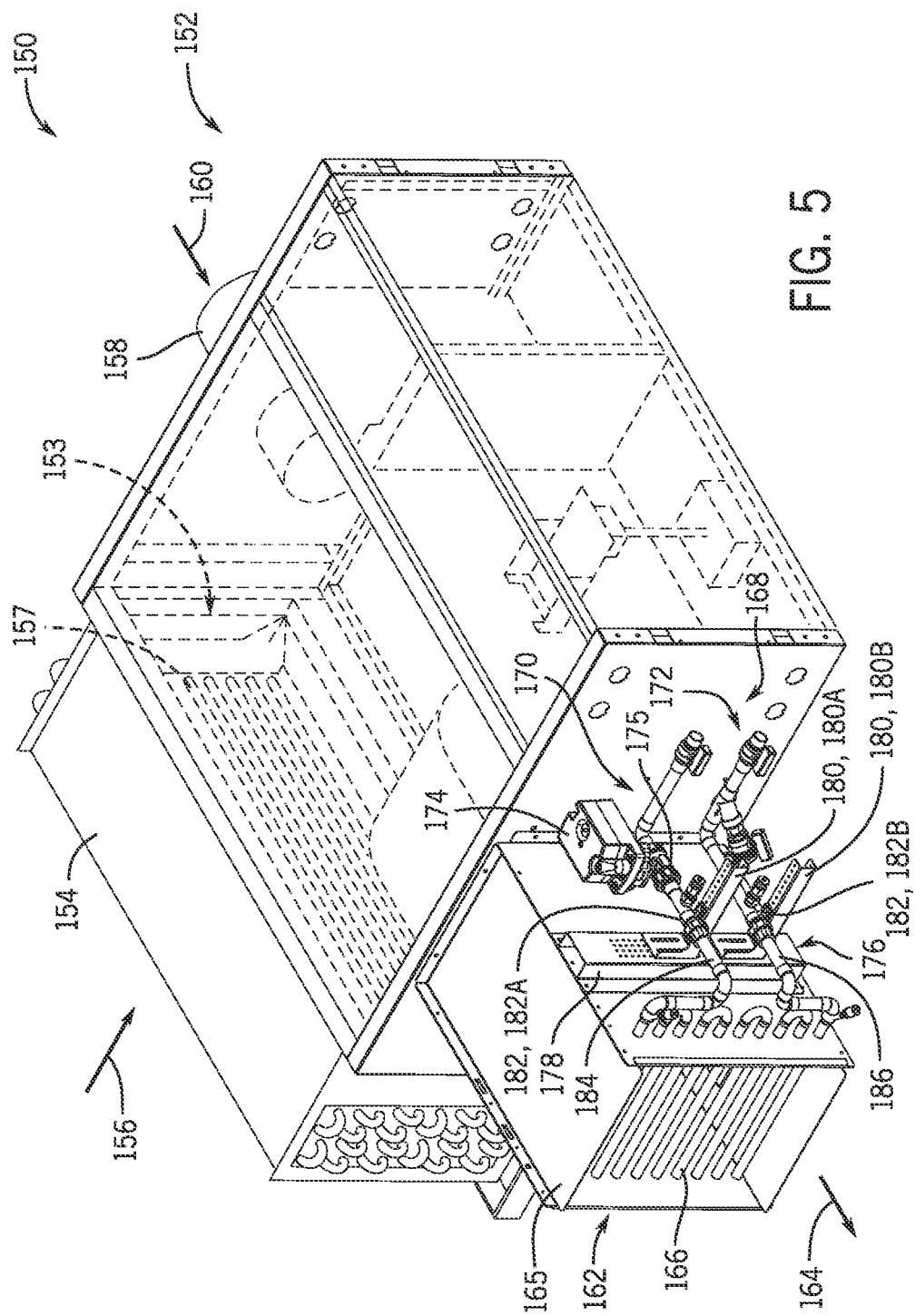
FIG. 5 is a perspective view of an embodiment of an HVAC system including a support assembly, in accordance with an aspect of the present disclosure.

With this in mind, FIG. 5 is a perspective view of an embodiment of an HVAC system 150 that may be configured to condition an air flow. For example, the HVAC system 150 may be a terminal unit, a packaged HVAC unit, an air handler, or another other suitable HVAC system. The HVAC system 150 may include a housing 152 through which the air flow is directed for conditioning. For example, air may be directed (e.g., from an ambient environment, from another HVAC system, from a duct) into the housing 152 via an inlet 153 (e.g., a first inlet, an inlet duct) of the housing 152 and across a first heat exchanger 154 (e.g., in a first inlet direction 156). The first heat exchanger 154 may be configured to condition (e.g., cool) the air flowing across the first heat exchanger 154. For example, the first heat exchanger 154 may include cooling coils 157 and the HVAC system 150 may circulate a chilled working fluid (e.g., water) through the cooling coils 157, and the air flow may be directed across the cooling coils 157. The chilled working fluid flowing through the cooling coils 157 may absorb heat from the air flowing across the cooling coils 157, thereby cooling the air flow. Additionally or alternatively, an air flow may be directed into the housing 152 via an inlet duct 158 (e.g., a second inlet) in a second inlet direction 160. For example, the inlet duct 158 may be fluidly coupled to ductwork and may receive the air flow (e.g., from an ambient environment, from another air handler or HVAC system). In certain embodiments, the air flowing through the inlet duct 158 and into the housing 152 may not flow across the first heat exchanger 154 or another heat exchanger configured to cool the air flow. Thus, the air flowing into the housing 152 via the inlet duct 158 may not be cooled by the HVAC system 150.

The HVAC system 150 may discharge the air flow from the housing 152 via an outlet duct 165 (e.g., an enclosure) of the housing 152. The outlet duct 165 may include a second heat exchanger 162 across which the air is directed (e.g., in an outlet direction 164) as the air is discharged from the housing 152. In some embodiments, the second heat exchanger 162 may be configured to heat the air flowing through the second heat exchanger 162. In the illustrated embodiment, the outlet duct 165 defines a passage through which the air is discharged from the housing, and the second heat exchanger 162 includes heating coils 166 extending across the passage of the outlet duct 165. A heated working fluid (e.g., water) may be directed through the heating coils 166 during operation of the second heat exchanger 162. The air flowing across the heating coils 166 may absorb heat from the heated working fluid directed through the heating coils 166, thereby heating the air flow.

In certain embodiments, the HVAC system 150 may operate to cool the air flow via the first heat exchanger 154 to condense moisture contained in the air flow, thereby dehumidifying the air flow, and to heat the dehumidified air flow via the second heat exchanger 162 to increase the temperature of the dehumidified air flow to a target, desirable, or comfortable temperature. As an example, the HVAC system 150 may receive the air flow via the first heat exchanger 154 and not via the inlet duct 158. Thus, substantially all of the air flowing through the second heat exchanger 162 may be received from the first heat exchanger 154. As another example, the HVAC system 150 may receive a first air flow via the first heat exchanger 154 and a second air flow via the inlet duct 158, and the first and second air flows may mix within the housing 152. As such, the second heat exchanger 162 may receive a mixture or combination of the first and second air flows. In additional or alternative embodiments, the HVAC system 150 may operate to heat the air flow via the second heat exchanger 162 without cooling the air flow (e.g., chilled working fluid may not be circulated through the first heat exchanger 154 and/or air flow may not be directed into the HVAC system 150 through the first heat exchanger 154). In further embodiments, the HVAC system 150 may operate to cool the air flow without heating the air flow via the second heat exchanger 162. For instance, heated working fluid may not be circulated through the heating coils 166, and the HVAC system 150 may discharge the air flow through the outlet duct 165 without heating the air flow via the heating coils 166.

While the second heat exchanger 162 may be configured to circulate heated working fluid to heat the air flow, in additional or alternative embodiments, the second heat exchanger may heat the air flow using other techniques, such as an electric heater and/or a gas heater. Further, in some embodiments, the HVAC system 150 may not include the first heat exchanger 154. For example, the HVAC system 150 may be configured to receive a first air flow (e.g., from a conditioned environment) via the inlet 153 and a second air flow (e.g., a conditioned air flow from another HVAC unit or air handler) via the inlet duct 158, and the second heat exchanger 162 may be configured to heat and/or cool the first air flow and/or second air flow upon discharge from the HVAC system 150.

The illustrated HVAC system 150 includes a valve package 168 (e.g., a conduit system, a valve system) fluidly coupled to the heating coils 166. The valve package 168 may be configured to control flow (e.g., a flow rate) of the heated working fluid through the heating coils 166. For example, the valve package 168 may include first conduit(s) 170, which may be fluidly coupled to an inlet of the heating coils 166. The valve package 168 may also include second conduit(s) 172, which may be fluidly coupled to an outlet of the heating coils 166. Thus, the first conduits 170 may direct the heated working fluid into the heating coils 166, and the second conduits 172 may direct the heated working fluid out of the heating coils 166. For instance, the conduits 170, 172 may circulate the heated working fluid between the heating coils 166 and a heated working fluid source positioned external to the housing 152. Thus, the conduits 170, 172 may be positioned at least partially external to the housing 152. In some embodiments, the valve package 168 may include an actuator 174, which may control an opening of a valve 175 disposed along the first conduits 170 to a flow of the heated working fluid through the first conduits 170 and into the heating coils 166. Additionally or alternatively, the actuator 174 may control an opening of a valve of the second conduits 172 to control a flow rate of the heated working fluid through the second conduits 172 and out of the heating coils 166. By way of example, the actuator 174 may be used to control an amount of heating provided by the heating coils 166 to the air flowing through the second heat exchanger 162 by controlling the flowrate of the heated working fluid.

The HVAC system 150 may also include a support assembly 176 (e.g., a valve package support assembly) configured to support and secure the valve package 168 (e.g., relative to the housing 152). The support assembly 176 may include a mounting bracket 178, which may be configured to couple (e.g., mount, secure) to the outlet duct 165 of the housing 152, and support brackets 180, each of which may be configured to couple (e.g., mount, secure) to the mounting bracket 178. The support assembly 176 may further include respective clamps 182 configured to couple (e.g., mount) to each of the support brackets 180 and to capture and extend about one of the conduits 170, 172. For instance, the support assembly 176 may include a first support bracket 180A and a first clamp 182A coupled (e.g., mounted, secured) to the first support bracket 180A. The first clamp 182A may be configured to receive, capture, and extend about a first conduit 184 of the first conduits 170, thereby securing the first conduit 184 to the support assembly 176. The support assembly 176 may also include a second support bracket 180B and a second clamp 182B coupled (e.g., mounted, secured) to the second support bracket 180B. The second clamp 182B may be configured to receive, capture, and extend about a second conduit 186 of the second conduits 172, thereby securing the second conduit 186 to the support assembly 176. Indeed, in an installed configuration of the support assembly 176 in which the support assembly 176 is mounted to the HVAC system 150, the clamps 182 may block movement of the conduits 184, 186 relative to the support brackets 180, the mounting bracket 178, the outlet duct 165, and the housing 152. Thus, the support assembly 176 may maintain a positioning, a structural integrity, and/or a geometry of the conduits 170, 172.

Although the illustrated support assembly 176 is configured to support the conduits 184, 186, the support assembly 176 may be configured to support any number of conduits in additional or alternative embodiments. For example, the support assembly 176 may include any number of support brackets 180 and/or clamps 182 to support and secure any suitable number or arrangement of conduits, such as a respective support bracket 180 and clamp 182 for each individual conduit. Indeed, multiple support brackets 180 of a common embodiment may be implemented to support the conduits (e.g., the conduits 184, 186) and avoid the manufacture of a specific support assembly (e.g., a specific embodiment of a support bracket, multiple unique embodiments of support brackets) for supporting multiple conduits arranged in a particular manner. Thus, the support bracket 180 may facilitate ease of manufacture of the support assembly 176. Furthermore, in some embodiments, the support assembly 176 may be configured to support a different set of conduits, such as conduits for directing fluid flow through the first heat exchanger 154 (e.g., through the cooling coils 157) and/or conduits positioned within the housing 152. Indeed, the support assembly 176 may be implemented in any suitable manner to support any of the conduits of the HVAC system 150.

Figure 6:
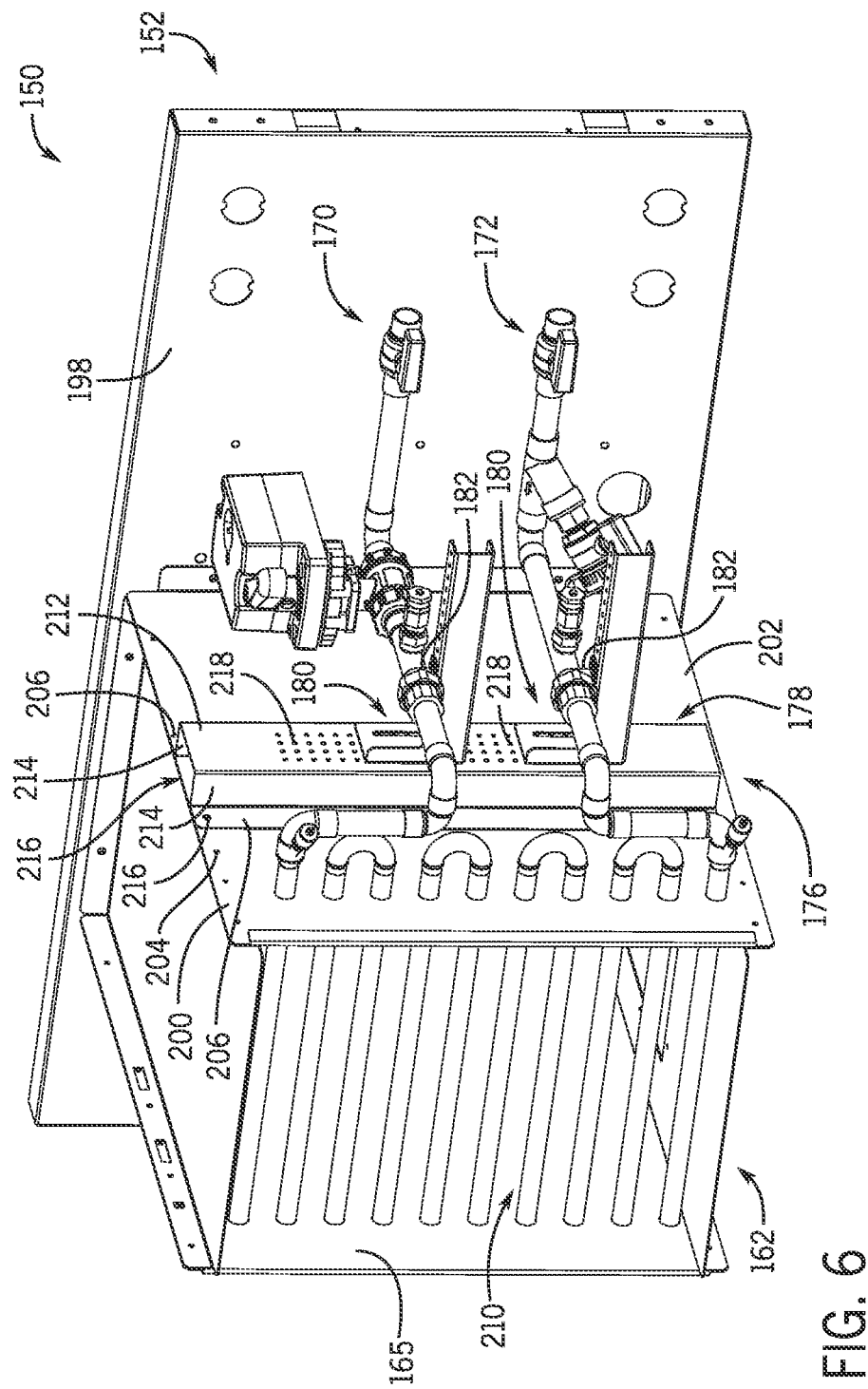
FIG. 6 is a perspective view of an embodiment of a portion of an HVAC system including a support assembly, in accordance with an aspect of the present disclosure.

FIG. 6 is a perspective view of a portion of the HVAC system 150, illustrating the second heat exchanger 162, the conduits 170, 172, and the support assembly 176. The outlet duct 165 of the housing 152 may be configured to couple to a first wall or panel 198 of the housing 152 of the HVAC system 150, which may include an opening or passage configured to fluidly couple the outlet duct 165 with an interior volume of the housing 152. Additionally, the support assembly 176 may be configured to couple to a second wall or panel 200 of the outlet duct 165. For example, the second wall 200 may include wall flanges 202 through which first holes 204 (e.g., connectors) may be formed. The mounting bracket 178 may include first bracket flanges 206 (e.g., mounting flanges) through which second holes 208 (e.g., connectors) may be formed to couple (e.g., mount, secure) the first bracket flanges 206 to the housing 152. The second holes 208 may be configured to align with the first holes 204 of the wall flanges 202. Respective fasteners may be inserted through the aligned holes 204, 208 to bias the mounting bracket 178 and the second wall 200 against one another, thereby securing the mounting bracket 178 to the outlet duct 165. It should be noted that the first holes 204 formed on the wall flanges 202 do not extend into an interior volume 210 of the outlet duct 165. Thus, the coupling between the support assembly 176 and the outlet duct 165 may not affect the air flowing through the outlet duct 165. For example, as the first holes 204 are not exposed to the interior volume 210, the outlet duct 165 may be less susceptible to air leakage via the first holes 204 formed in the second wall 200.

The mounting bracket 178 may also include a mounting segment 212 (e.g., a mounting surface, a mounting face, a support bracket mounting segment) and connecting segments 214 joining the first bracket flanges 206 and the mounting segment 212 to one another. For instance, the connecting segments 214 may extend from the first bracket flanges 206 to the mounting segment 212, such that the mounting segment 212 is offset from the first bracket flanges 206 and the second wall 200. In this way, the mounting bracket 178 forms a channel 216 extending along a length of the mounting bracket 178 between the second wall 200, the mounting segment 212, and the connecting segments 214. In other words, the mounting bracket 178 may define a hat channel formed via the first bracket flanges 206, the mounting segment 212, and the connecting segments 214. Third holes 218 (e.g., connectors) may be formed through the mounting segment 212. The third holes 218 may be configured to receive fasteners for coupling the support brackets 180 to the mounting bracket 178, and the fasteners may extend into and terminate within the channel 216 (e.g., without contacting the second wall 200). Thus, the channel 216 of the mounting bracket 178 may block the fasteners from extending through the second wall 200, such as into the interior volume 210 of the outlet duct 165. As such, the coupling between the outlet duct 165, the mounting bracket 178, and the support brackets 180 may not impact the air flowing through the outlet duct 165.

Although the illustrated embodiment includes a single support assembly 176 configured to secure to multiple conduits, in additional or alternative embodiments, a separate support assembly 176 may be configured to secure to each separate conduit. For example, each support assembly 176 may include a separate clamp configured to individually couple to a respective conduit to improve versatility with respect to positioning the clamps to align with the conduits. In further embodiments, multiple support assemblies 176 may be configured to secure to the same conduit. That is, multiple support assemblies 176 may include separate clamps, and each of the clamps may be positioned to align with the same conduit and further secure the conduit with respect to other components of the HVAC system 150.

Figure 7:
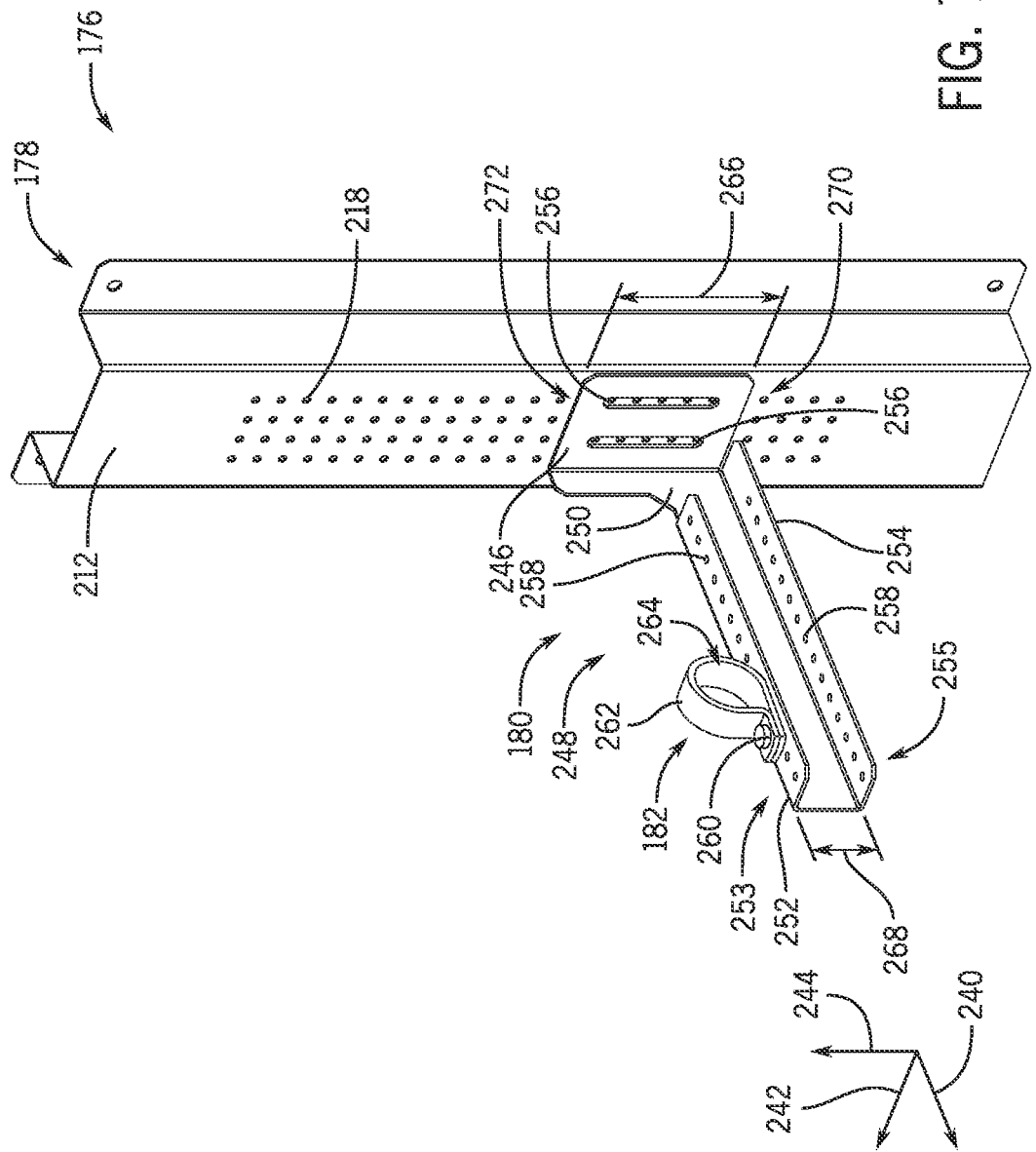
FIG. 7 is a perspective view of an embodiment of a support assembly that may be incorporated in an HVAC system, in accordance with an aspect of the present disclosure.

FIG. 7 is a perspective view of an embodiment of the support assembly 176. For visualization purposes, the illustrated support assembly 176 includes a single support bracket 180 coupled to the mounting bracket 178. Additionally, to facilitate discussion, features of the support assembly 176 will be described with reference to a longitudinal axis or direction 240, a lateral axis or direction 242, and a vertical axis or direction 244.

The support bracket 180 may include a base 246 and an arm 248 (e.g., a cantilevered arm) extending from the base 246. For example, the arm 248 may include a segment 250 (e.g., an intermediate segment, a base segment) extending from the base 246 along the longitudinal axis 240 in an assembled configuration of the support assembly 176 in which the mounting bracket 178, the support bracket 180, and the clamp 182 are coupled (e.g., secured) to one another. The base 246 may be configured to couple (e.g., mount) to the mounting segment 212 to couple (e.g., secure) the support bracket 180 and the mounting bracket 178 to one another. Additionally, a second bracket flange 252 may extend from a first side 253 (e.g., a first edge) of the segment 250 along the lateral axis 242, and a third bracket flange 254 may extend from a second side 255 (e.g., a second edge), opposite the first side 253, of the segment 250 along the lateral axis 242. Thus, the segment 250 and the bracket flanges 252, 254 may form a C-channel configuration. The clamp 182 may be configured to separately couple (e.g., mount, secure) to each of the second bracket flange 252 and the third bracket flange 254 of the arm 248 in order to secure the clamp 182 and the support bracket 180 to one another.

In the illustrated embodiment, slots 256 are formed through the base 246. The slots 256 may be configured to align with the third holes 218 formed through the mounting segment 212 to enable the mounting bracket 178 and the support bracket 180 to be coupled to one another in each of a variety of configurations or arrangements. In some embodiments, the third holes 218 may be spaced (e.g., arrayed) along and/or across the mounting segment 212, such as along multiple rows (e.g., along the lateral axis 242 or a width of the mounting bracket 178) and/or columns (e.g., along the vertical axis 244 or a length of the mounting bracket 178), to enable the base 246 to be coupled at various positions relative to the mounting bracket 178. For example, the support bracket 180 may be configured to couple to the mounting bracket 178 at each of a plurality of positions along the vertical axis 244 and/or the lateral axis 242. At each position of the plurality of positions, the slots 256 may align with a subset of the third holes 218, and fasteners may be inserted through the aligned third holes 218 and slots 256 to bias the mounting bracket 178 and the support bracket 180 against one another and secure the support bracket 180 at a selected position along the mounting bracket 178. Thus, the support bracket 180 may be configured to be adjustably positioned relative to the mounting bracket 178 along the vertical axis 244 and/or the lateral axis 242. Indeed, a mounting position of the support bracket 180 on the mounting bracket 178 may be selected based on a position (e.g., along the vertical axis 244) of a conduit (e.g., the conduits 184, 186) to be secured by the clamp 182 coupled to the support bracket 180.

Furthermore, fourth holes 258 (e.g., connectors) may be formed through each of the second bracket flange 252 and the third bracket flange 254 of the support bracket 180. Each of the fourth holes 258 may be configured to separately align with fifth holes 260 (e.g., connectors) of the clamp 182. For example, multiple fourth holes 258 may be formed and spaced along each of the second bracket flange 252 and the third bracket flange 254, such as along the longitudinal axis 240, and each fourth hole 258 may be associated with a corresponding position to which the clamp 182 may be secured to the support bracket 180. Thus, the clamp 182 may be configured to separately couple to the support bracket 180 at each of a plurality of positions along the longitudinal axis 240. At each position of the plurality of positions, the fifth holes 260 of the clamp 182 may align with at least one of the fourth holes 258, and one or more fasteners may be inserted through the aligned fourth holes 258 and fifth holes 260 to bias the clamp 182 and the support bracket 180 against one another and secure the clamp 182 at a selected position along the support bracket 180. As such, the support bracket 180 enables the clamp 182 to be adjustably positioned relative to the support bracket 180 along the longitudinal axis 240. For instance, a position of the clamp 182 may be selected based on a position of a conduit (e.g., along the longitudinal axis 240, relative to the housing 152) to be supported and secured by the clamp 182. Indeed, the position of the support bracket 180 and the clamp 182 may be adjusted relative to the mounting bracket 178 to align the clamp 182 with a conduit (e.g., the conduits 184, 186) and avoid imparting undesirable stress onto the conduit while the clamp 182 is secured to the conduit.

The illustrated clamp 182 includes a brace 262 (e.g., a band, a strap, a tie, a bind) configured to form an opening 264 through which the conduit secured by the clamp 182 may extend. For example, the brace 262 (e.g., an interior surface of the brace 262) may capture the conduit to secure the conduit and block movement of the conduit within the opening 264. The brace 262 may, for instance, be made of a material, such as plastic, nylon, or rubber, that avoids affecting a structural integrity or characteristic of a surface of the conduit when the brace 262 is coupled to the conduit. In some embodiments, the brace 262 may be formed from a metal, such as steel, and may include a surface coating or treatment, such as a rubberized coating or a nylon coating.

Additionally, in certain embodiments, the fifth holes 260 may be sized to enable additional positioning of the clamp 182 relative to the support bracket 180. By way of example, the fifth holes 260 may include slots or openings (e.g., openings larger than openings of the fourth holes 258) to enable the clamp 182 to move along the segment 250 while remaining aligned with at least one of the fourth holes 258. Indeed, for each individual fourth hole 258, the fifth holes 260 may enable the clamp 182 to move to different positions along the longitudinal axis 240 and remain aligned with the same fourth hole 258 (e.g., due to the larger size of the fifth hole 260 relative to the fourth holes 258). Moreover, the fifth holes 260 may be sized to facilitate coupling between the support bracket 180 and the clamp 182. By way of example, fasteners used for securing the support bracket 180 and the clamp 182 to one another may include screw threads. The size of fifth holes 260, which may be clearance holes, may have an increased size to enable the screw threads to clear and be easily inserted through the fifth holes 260. Additionally, the fourth holes 258, which may be engagement holes, may have a reduced size to enable the screw threads to engage (e.g., thread through) the second bracket flange 252 or the third bracket flange 254 to secure to the support bracket 180. As such, a fastener may be inserted through the clamp 182 via the fifth holes 260 and engage the support bracket 180 via the fourth holes 258 to bias the clamp 182 against the support bracket 180.

Although the illustrated clamp 182 is coupled to the second bracket flange 252, in additional or alternative embodiments, the clamp 182 may be coupled to the third bracket flange 254. Furthermore, although the illustrated clamp 182 is oriented such that the brace 262 is positioned more proximate to the mounting bracket 178 than the fifth holes 260 are positioned relative to the mounting bracket 178, in additional or alternative embodiments, the clamp 182 may be oriented such that the fifth holes 260 are positioned more proximate to the mounting bracket 178 than the fifth holes 260 are positioned relative to the mounting bracket 178. Indeed, the clamp 182 may be rotated about the vertical axis 244 relative to the support bracket 180 in order to align with a conduit, such as a conduit that is extending at any suitable angle with respect to the arm 248 of the support bracket 180.

In some embodiments, a first dimension 266 (e.g., a height, length, vertical dimension) of the base 246 may be greater than a second dimension 268 (e.g., a height, length, vertical dimension) of the segment 250 extending between the first and second bracket flanges 252, 254. For example, the first dimension 266 may be selected to enable adequate securement of the support bracket 180 to the mounting bracket 178 (e.g., via fasteners extending through the aligned slots 256 and third holes 218). Additionally, the second dimension 268 may be less than the first dimension 266 to reduce a physical footprint of the arm 248, thereby facilitating improved positioning of the support bracket 180. For example, the reduced second dimension 268 of the arm 248 may reduce interference between the support bracket 180 and other components of the HVAC system 150 (e.g., the conduits 170, 172, the actuator 174, components external to the housing 152, components surrounding the housing 152), thereby enabling the support bracket 180 to be installed in a greater number of positions relative to the mounting bracket 178. The arm 248 may be offset (e.g., vertically offset, offset along vertical axis 244) from a center of the base 246 due to the difference between the first dimension 266 and the second dimension 268. Thus, in some embodiments, the support bracket 180 may form an L-shaped configuration. For example, the arm 248 may extend from a first end 270 of the base 246, and a second end 272, opposite of the first end 270, of the base 246 may extend beyond the second bracket flange 252 (e.g., along the vertical axis 244). In the illustrated support assembly 176, the support bracket 180 is oriented (e.g., in a mounting position along the mounting bracket 178) such that the first end 270 of the base 246 is below a second end 272, opposite the first end 270, of the base 246 with respect to the vertical axis 244. In additional or alternative embodiments, the support bracket 180 may be oriented such that the first end 270 is above the second end 272 with respect to the vertical axis 244.

Figure 8:
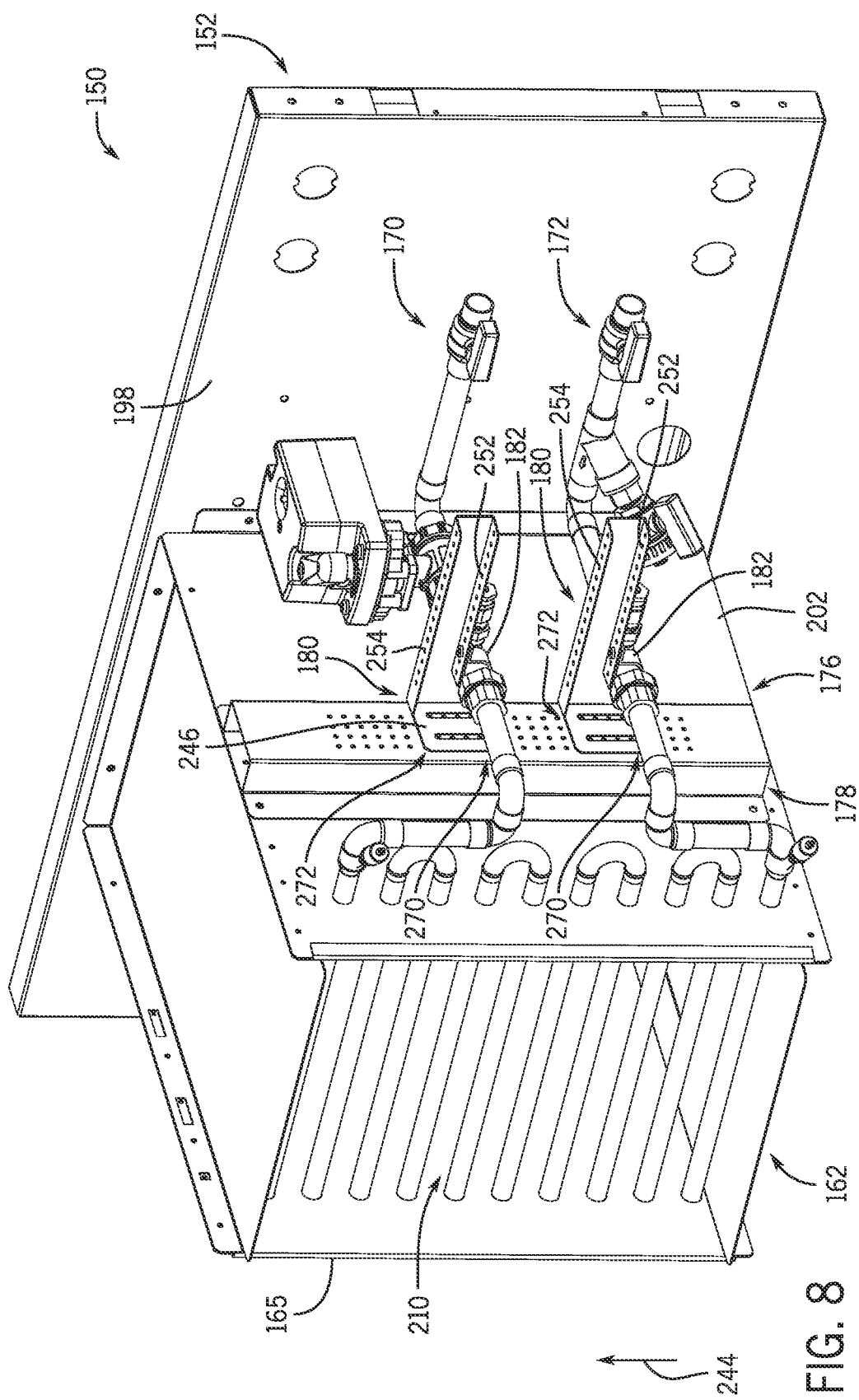
FIG. 8 is a perspective view of an embodiment of a portion of an HVAC system including a support assembly, in accordance with an aspect of the present disclosure.

FIG. 8 is a perspective view of a portion of the HVAC system 150, illustrating an embodiment of the second heat exchanger 162, the conduits 170, 172, and the support assembly 176. In the illustrated embodiment, the support assembly 176 includes two support brackets 180, with each support bracket 180 securing one of the conduits 170, 172. The support brackets 180 are oriented such that, for each of the support brackets 180, the respective second end 272 of the base 246 is above the corresponding first end 270 of the base 246 with respect to the vertical axis 244. Moreover, each of the clamps 182 is coupled to one of the third bracket flanges 254. In additional or alternative embodiments, one of the support brackets 180 may be oriented such that the first end 270 of the base 246 is above the second end 272 of the base 246 with respect to the vertical axis 244, and another of the support brackets 180 may be oriented such that the second end 272 is above the first end 270 with respect to the vertical axis 244. In further embodiments, any of the clamps 182 may be coupled to the third bracket flange 254 of a corresponding support bracket 180. Indeed, the support brackets 180 and the clamps 182 may be coupled in any suitable manner, position, or arrangement, (e.g., relative to the one another and/or the mounting bracket 178) to align the clamps 182 with the respective conduits for securement.

FIG. 9 is a perspective view of a portion of an HVAC system 300 in which a support assembly 302 is configured to secure three conduits 304 in respective positions relative to other components of the HVAC system 300. For example, the support assembly 302 may include two support brackets 306. Each of the support brackets 306 may include a base 308 and an arm 310 (e.g., a cantilevered arm) extending from the base 308. A first support bracket 306A may support two conduits 304A, 304B, and a second support bracket 306B may support another conduit 304C. To this end, respective arms 310 of the support brackets 306 may be sized to enable positioning of clamps 312 along the arms 310 for securing the conduits 304. For example, a length or dimension by which each of the arms 310 extends from its corresponding base 308 for the support brackets 306 may be greater than the length or dimension by which each of the arms 248 extends from its corresponding base 246 for the support brackets 180 discussed above with reference to FIG. 7. In this way, the support assembly 302 of FIG. 9 may provide an increased number of positions at which each respective clamp 312 may be positioned along one of the arms 310 to receive and secure one of the conduits 304. For instance, multiple clamps 312 may be coupled to the first support bracket 306A to support the conduits 304A, 304B.

In the illustrated embedment, the support brackets 306 are also directly mounted to a housing 314 (e.g., a wall of the housing 314) of the HVAC system 300. For example, the base 308 of each support bracket 306 may be coupled (e.g., mounted) to the housing 314 without a mounting bracket (e.g., the mounting bracket 178). However, in additional or alternative embodiments, an embodiment of the mounting bracket 178 may be used to mount each of the support brackets 306 to the housing 314.

Although the embodiments described above include holes 204, 208, 218, 258, 260 and/or slots 256 to enable various components to couple, mount, or secure to one another. Any of the components may include different features and connectors in additional or alternative embodiments. For example, any of the components may include extensions, tabs, hooks, punches, fittings, and the like to enable adjustable positioning and coupling between the components.

The present disclosure may provide one or more technical effects useful for manufacturing, transporting, and/or installing an HVAC system. For example, the HVAC system may include a conduit configured to direct a fluid, such as a working fluid, through the HVAC system. The HVAC system may also include a support assembly configured to support and secure the conduit and block movement of the conduit relative to other components of the HVAC system, such as relative to a housing. In this way, the support assembly may improve an operation of the conduit to direct the fluid, improve installation of the conduit in the HVAC system, facilitate more convenient transportation of the HVAC system, and/or improve the structural integrity of the HVAC system and components thereof. The support assembly may include a bracket configured to couple to the housing of the HVAC system and a clamp configured to couple to the bracket. The bracket may include a base, which may be adjustably positioned relative to the housing of the HVAC system along a first axis. Additionally, the bracket may include an arm, and the clamp may be configured to be adjustably positioned relative to the arm along a second axis crosswise to the first axis. Indeed, the bracket may be adjusted along the first axis, and the clamp may be adjusted along the second axis to enable the clamp to accommodate a corresponding position of the conduit and desirably secure and maintain a position of the conduit relative to the housing. As such, the support assembly may be adjustable to secure one or more of various conduits located at different positions, and a single embodiment of the support assembly may be manufactured for utilization with different embodiments of HVAC systems having different conduit arrangements, thereby improving manufacture, assembly, and/or installation of the support assembly and the HVAC systems. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A support assembly for a heating, ventilation, and/or air conditioning (HVAC) system, comprising:
    a bracket comprising a base and an arm extending from the base, wherein the arm comprises:
        a base segment extending from an edge of the base;
        an upper flange; and
        a lower flange, each of the upper flange and the lower flange comprising a plurality of connectors configured to facilitate coupling to a clamp at each of a plurality of positions along the arm, wherein the arm is configured to engage with and support a conduit of the HVAC system via the clamp, and wherein the upper flange extends from a first edge of the base segment and the lower flange extends from a second edge, opposite the first edge, of the base segment.

2. The support assembly of claim 1, comprising an additional bracket configured to couple to a housing of the HVAC system, wherein the base of the bracket is configured to couple to the additional bracket.

3. The support assembly of claim 2, wherein the additional bracket comprises:
    a first mounting flange and a second mounting flange each configured to be secured to the housing of the HVAC system;
    a bracket mounting segment configured to be secured to the bracket;
    a first connecting segment extending between the first mounting flange and a first edge of the bracket mounting segment; and
    a second connecting segment extending between the second mounting flange and a second edge of the bracket mounting segment, wherein the first connecting segment, the second connecting segment, and the bracket mounting segment collectively define a hat channel of the additional bracket, wherein the hat channel is configured to provide an offset from a wall of the housing of the HVAC system.

4. The support assembly of claim 3, wherein the bracket mounting segment of the additional bracket comprises a plurality of holes formed therein, and the base of the bracket comprises a slot formed therein and configured to align with a subset of the plurality of the holes.

5. The support assembly of claim 4, wherein the plurality of holes is spaced along a length and/or a width of the bracket mounting segment of the additional bracket.

6. The support assembly of claim 1, wherein each of the plurality of connectors of the upper flange and the lower flange comprises a plurality of holes formed therein, and each hole of the plurality of holes is configured to separately align with a connector of the clamp.

7. A support assembly for a heating, ventilation, and/or air conditioning (HVAC) system, comprising:
    a mounting bracket configured to be secured to a housing of the HVAC system and configured to extend along and define a first axis of the support assembly in an assembled configuration of the support assembly;
    a support bracket configured to be secured to the mounting bracket and configured to define a second axis, crosswise to the first axis, of the support assembly in the assembled configuration of the support assembly, wherein the support bracket comprises an upper flange and a lower flange configured to extend along the second axis, and wherein the support bracket is configured to be adjustably positioned relative to the mounting bracket along the first axis of the support assembly; and a clamp configured to be secured to the upper flange or the lower flange of the support bracket, wherein the clamp is configured to be adjustably positioned relative to the support bracket along the second axis, and the clamp is configured to secure a conduit of the HVAC system to the support assembly.

8. The support assembly of claim 7, wherein the support bracket is configured to be secured to the mounting bracket at each position of a plurality of positions along the first axis, the mounting bracket comprises a plurality of holes formed therein, the support bracket comprises a slot formed therein, and the slot of the support bracket is configured to align with at least one hole of the plurality of holes at each position of the plurality of positions.

9. The support assembly of claim 7, wherein the support bracket comprises an arm extending along the second axis and a base extending along the first axis in the assembled configuration of the support assembly, wherein the arm extends from a first edge of the base, the upper flange extends from a first edge of the arm, and the lower flange extends from a second edge of the arm, opposite the first edge of the arm, in the assembled configuration of the support assembly.

10. The support assembly of claim 9, wherein the clamp is configured to be secured to the upper flange or the lower flange of the arm at each position of a plurality of positions along the second axis, each of the upper flange and the lower flange of the arm comprises a plurality of first holes formed therein, the clamp comprises a second hole formed therein, and the second hole of the clamp is configured to align with a corresponding hole of the plurality of first holes at each position of the plurality of positions.

11. The support assembly of claim 7, comprising an additional support bracket configured to be secured to the mounting bracket, wherein the additional support bracket comprises an additional upper flange and an additional lower flange and is configured to be adjustably positioned relative to the mounting bracket along the first axis of the support assembly, wherein each of the support bracket and the additional support bracket extends from the mounting bracket along the second axis in the assembled configuration of the support assembly.

12. The support assembly of claim 11, comprising an additional clamp configured to be secured to the upper flange or the lower flange of the additional support bracket, wherein the additional clamp is configured to be adjustably positioned relative to the additional support bracket along the second axis, and the additional clamp is configured to secure an additional conduit of the HVAC system to the support assembly.

13. The support assembly of claim 7, comprising an additional clamp configured to be secured to the upper flange or the lower flange of the support bracket, wherein the additional clamp is configured to be adjustably positioned relative to the support bracket along the second axis, and the additional clamp is configured to secure an additional conduit of the HVAC system to the support assembly.

14. The support assembly of claim 7, wherein the mounting bracket comprises a first mounting flange, a second mounting flange, a support bracket mounting segment, a first connecting segment extending between the first mounting flange and the support bracket mounting segment, and a second connecting segment extending between the second mounting flange and the support bracket mounting segment, wherein the mounting bracket is configured to be secured to the housing of the HVAC system, the support bracket mounting segment is configured to be secured to the support bracket, and wherein the first connecting segment, the second connecting segment, and the support bracket mounting segment at least partially define a channel configured to offset a wall of the housing to which the mounting bracket is coupled from one or more fasteners extending through the support bracket mounting segment.

15. A heating, ventilation, and/or air conditioning (HVAC) system, comprising:
a housing configured to direct an air flow therethrough;
a conduit; and
a support assembly mounted to the housing, wherein the support assembly comprises:
a mounting bracket mounted to the housing;
a cantilevered arm secured to the mounting bracket and extending away from the housing, the cantilevered arm comprising an upper flange and a lower flange; and
a clamp secured to the upper flange or the lower flange of the cantilevered arm, wherein the clamp extends about the conduit and secures the conduit to the support assembly,
wherein the cantilevered arm is configured to be secured to the mounting bracket at each first position of a plurality of first positions, and the clamp is configured to be secured to the upper flange or the lower flange of the cantilevered arm at each second position of a plurality of second positions.

16. The HVAC system of claim 15, wherein each of the upper flange and the lower flange of the cantilevered arm comprises a plurality of first holes formed therein, the clamp comprises a second hole formed therein and configured to separately align with each first hole of the plurality of first holes, and each first hole of the plurality of first holes is associated with a corresponding second position of the plurality of second positions.

17. The HVAC system of claim 15, comprising heat exchanger coils mounted to the housing, wherein the conduit is fluidly coupled to the heat exchanger coils and is configured to direct a working fluid through the heat exchanger coils, and the heat exchanger coils are configured to place the working fluid in a heat exchange relationship with the air flow directed through the housing.

18. The HVAC system of claim 17, comprising a valve disposed along the conduit, wherein the valve is configured to regulate a flow of the working fluid through the conduit and the heat exchanger coils.

19. The HVAC system of claim 15, wherein the mounting bracket comprises a mounting flange secured to the housing and a mounting surface, the cantilevered arm is secured to a first edge of the mounting surface, and the mounting flange and the mounting surface are offset from one another to form a hat channel of the mounting bracket, wherein the hat channel is configured to block one or more fasteners from extending through a wall of the housing.

* * * * *